United States Patent [19]
Freitas et al.

[11] Patent Number: 6,128,998
[45] Date of Patent: Oct. 10, 2000

[54] CONTINUOUS INTERSECTING BRAIDED COMPOSITE STRUCTURE AND METHOD OF MAKING SAME

[75] Inventors: Glenn Freitas, Foxboro; Thomas Campbell, Concord; Garry Kasten, Framingham, all of Mass.

[73] Assignee: Foster Miller, Inc., Waltham, Mass.

[21] Appl. No.: 09/096,987

[22] Filed: Jun. 12, 1998

[51] Int. Cl.[7] .................................................. D04C 1/06
[52] U.S. Cl. ................................ 87/8; 87/11; 87/1; 87/13
[58] Field of Search .................................. 87/1, 8, 11, 13, 87/2, 5

[56] References Cited

U.S. PATENT DOCUMENTS

| | | | |
|---|---|---|---|
| 4,686,134 | 8/1987 | Ono | 428/22 |
| 5,388,498 | 2/1995 | Dent et al. | 87/50 |
| 5,419,231 | 5/1995 | Earle, III et al. | 87/1 |

*Primary Examiner*—Blaine Copenheaver
*Assistant Examiner*—Cheryl Juska
*Attorney, Agent, or Firm*—Kirk Teska; Iandiorio & Teska

[57] ABSTRACT

A continuous intersecting braided composite preform including a first member with at least one ply of biased fibers and a second member also with at least one ply of biased fiber. The first member intersects with the second member and passes continuously through the second member such that the biased fibers of the first member are interstitially arranged with respect to the biased fibers of the second member at the intersection.

11 Claims, 14 Drawing Sheets

CONTINUOUS INTERSECTING BRAIDED COMPOSITE STRUCTURE AND METHOD OF MAKING SAME

FIELD OF INVENTION

This invention relates to a continuous intersecting braided composite preform, a composite frame and stringer structure fabricated from such a preform, and a method of fabricating such a continuous intersecting braided preform composite structure.

BACKGROUND OF INVENTION

Braiding is a cost effective process for producing cylindrical structures for advanced composites. For example, carbon fibers have been braided into the shapes of helicopter drive shafts, launch tubes for shoulder-launched assault weapons, and even rocket nozzles. When the fibers are subsequently resin impregnated and cured, the resultant parts are lightweight and exhibit high strengths. In addition, composites have a high resistance to most chemical and environmental threats.

Braiding flat structures is also known. Although, there are other method of fabricating composite parts including hand lay-up of layers of fabric, braiding, is a preferred method in many instances since braiding is a highly effective process in terms of material usage. This is primarily due to the fact that the plies of a structure are created in-process, without wastage. No cutting or kitting is required. And, dry "biased" fibers, i.e., those orientated at an angle, may be braided on presently available braiding machines. Biased fibers in a flat structure are desirable because they are able to handle shear loads.

In contrast, fabrication processes which begin with tape or woven products must include the step of cutting bias plies from unbiased sections causing waste. Thus, braiding provides the dual advantage of using composites in their least cost material form and doing so in a material efficient manner.

Besides being an automated process, braiding is extremely attractive because of its versatility. A standard tubular braid can be used to fabricate any mandrel configuration which can be passed through it. Braiding is excellent for producing non-symmetrical structures with complex curvatures. Finally, standard braiders can be modified to produce a wide range of components.

One problem with all composite parts, however, is that they are difficult to join together. Most attachments schemes center around those acceptable for metals, i.e. using fasteners such as rivets, bolts, clips and the like. See U.S. Pat. No. 4,109,435, especially FIG. 4.

Fastening two composite parts is especially troublesome when one continuous structure intersects another continuous structure, i.e. where stringer members intersect a frame member, where rib members intersect bar members, or where longerons intersect with bulkheads. An example is an aircraft fuselage which is made up of a thin skin supported by frame members and intersecting stringers.

Often, to attach composite stringer members to a frame member, a "mouse hole" is cut in the frame to allow the stringer to pass through. Fasteners and additional lay up of fabric plies then secure the stringer/frame intersection. This joining process adds weight, labor, cost, and results in possible stress and fatigue points.

If the fibers of the plies of the stringer members are all non-biased, (i.e., parallel and running in the direction of and perpendicular to the stringer) and the fibers and the frame are similarly non-biased, weaving schemes to form a continuous intersection at the joint of the stringer and frame might not be too troublesome.

Constructions which include only these non-biased fibers, however, are not very strong in shear. Angled or "biased" fibers, on the other hand, in both the frame and the intersecting stringers, although exhibiting high shear strength, make it very difficult to weave a continuous intersection. So, frame members and stringer members are usually fabricated separately and then joined by cutting a hole in the frame member as described above.

SUMMARY OF INVENTION

It is therefore an object of this invention to provide a continuous intersecting composite preform in which the biased fibers of a stringer member are interstitially arranged with respect to the biased fibers of a frame member at the intersection thereof.

It is a further object of this invention to provide such a continuous intersecting composite preform which eliminates the need to cut the frame member or to use fasteners in order to join the frame member with intersecting stringers.

It is a further object of this invention to provide such a continuous intersecting composite preform in which the intersection of a frame and stringer is fabricated as the structure is formed.

It is a further object of this invention to provide such a continuous intersecting composite preform which eliminates the added weight, labor, material cost, and possible stress points associated with using fasteners to join such composite members.

It is a further object of this invention to provide a method of fabricating a continuous intersecting composite preform in which the biased fibers of one member are interstitially arranged with respect to the biased fibers of an intersecting member.

This invention results from the realization that the strength of a composite part at the intersection of one structural member with another structural member can be increased by interstitially arranging the biased fibers of the plies of each members at the intersection and the further realization that such a structure can be accomplished by a modified braiding machine which produces two separate flat braids, by passing the fiber packages of one braider to the carrier of the other braider to form an intersection of the braids, and then continuing to produce the two flat braids resulting in an undisturbed biased fiber preform which can be made into a continuous frame/stringer structure.

This invention features a continuous intersecting braided composite preform made up of first and second members. The first member includes at least one ply having biased fibers and the second member includes at least one ply having biased fibers. The first member intersects with the second member and the biased fibers of the first member are intersticially arranged with respect to the biased fibers of the second member at the intersection forming a continuous intersection of the first and second members.

The plies of either the first or second member or both of them can be triaxially braided including fibers biased at approximately 45°. The fibers may be carbon, ceramic, prepare material, or a thermoplastic material. Each members could include three plies and there may be additional intersecting members each including at least one ply having biased fibers intersecting with the first member.

This invention also features a continuous intersecting structure including a resin impregnated and cured braided preform. The preform includes a frame having at least one ply of biased fibers and an intersecting stringer having at least one ply of biased fibers. The biased fibers of the frame ply are interticially arranged with respect to the biased fibers of the stringer ply at the intersection thereof forming a continuous intersection of the frame and the stringer. There may be additional stringers intersecting with the frame and each stringer includes one or more plies of biased fibers. This stringer and the frame may include a plurality of plies including biased fibers interticially arranged at the intersection of the stringer and the frame.

This invention also features a method of fabricating a continuous intersecting braided preform including the steps of producing two flat braids of biased fibers simultaneously on a modified circular braider which has two flat braiders, transferring the carrier package of each braider to the carrier of the other thereby crossing the biased fibers of each braid forming a continuous intersection of the biased fibers, and continuing to produce two flat braids on the modified circular braider.

A method of fabricating a continuous intersecting braided preform comprises producing two flat braids of biased fibers simultaneously on a flat braider; transferring the carriers of a first braider bank to a second braider bank; transferring the carriers of the second braider bank to the first braider bank; and continuing to produce two flat braids on the flat braider thereby effecting a continuous intersection of the biased fibers between each flat braid.

DISCLOSURE OF PREFERRED EMBODIMENT

Other objects, features and advantages will occur to those skilled in the art from the following description of a preferred embodiment and the accompanying drawings, in which:

FIGS. 13 A–C illustrate the method steps for producing a continuous intersecting preform according to this invention;

Figure 1:
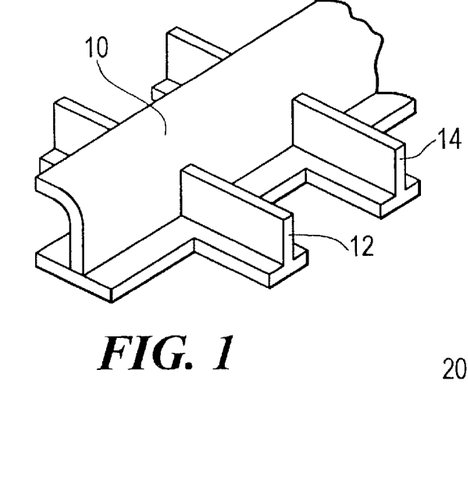
FIG. 1 is a front perspective view of a composite frame/stringer part.

A typical frame/stringer configuration is shown in FIG. 1. Frame member 10 intersects along its length with stringers 12, 14, etc. Such a structure is used in aircraft fuselages and the like. Other terms for such a construction are "rib/spar" and "bulkhead/longeron". The phrase "structural member" will be generically used herein for the intersecting components which are made up of one or more plies of braided material. Stringers 12 and 14 and frame 10, for example, could each include three plies of material. Each ply contains a number of braided tows and each tow is made up of many filaments. "Preform" is used to denote the intersecting components before they are resin impregnated and formed as a final composite part.

Figure 2:
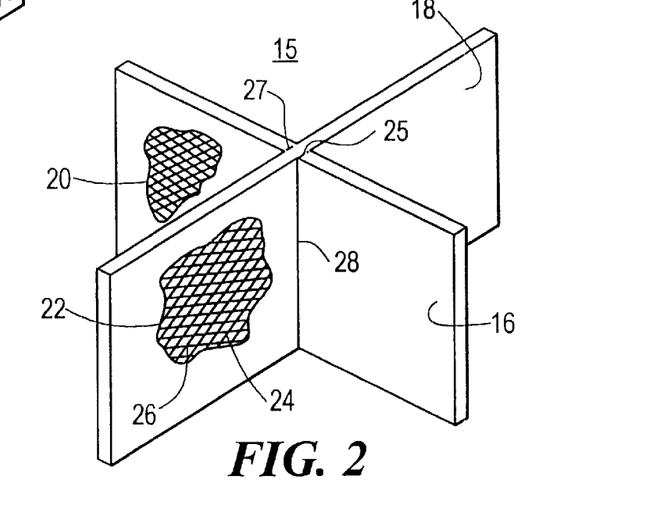
FIG. 2 is a partially cut away front perspective view of two continuously intersecting braided composite structural members including biased fibers according to this invention.

For example, intersecting structure 15, FIG. 2 includes structural member 16 intersecting with structural member 18. Each member 16 and 18 may include one or more resin impregnated plies of biased fabric as shown at 20 and 22, respectively. Each ply, in turn, contains biased tows (and hence biased fibers) as shown for tow 24 at +45° and tow 26 at −45°. As discussed in the Background of Invention above, biased tows are those orientated at other than 0° or 90° along the plane of the member. The biased tow construction is advantageous because of the greater shear strength of the resulting structural member.

But, as also explained in the Background above, the previous method of forming the intersection of members 16 and 18 which are made up of material containing biased tows is to use fasteners. For example, although in this invention member 16 is continuous through intersection 28, member 18 would normally be cut as shown by dashed lines 25 and 27. Fasteners and/or additional plies of fabric would then be used to secure the intersection of member 16 and 18. Or, a hole could be made in member 16 at intersection 28 so that member 18 can be made to pass through member 16. Again, fasteners and additional hand lay-up of additional plies would be required to secure a joint.

In this invention, however, intersection 28 of members 16 and 18 is continuous. This is accomplished by plies 20 and 22, the biased fibers of which are interstitially arranged with respect to each other as shown as 30, FIG. 3.

Figure 4:
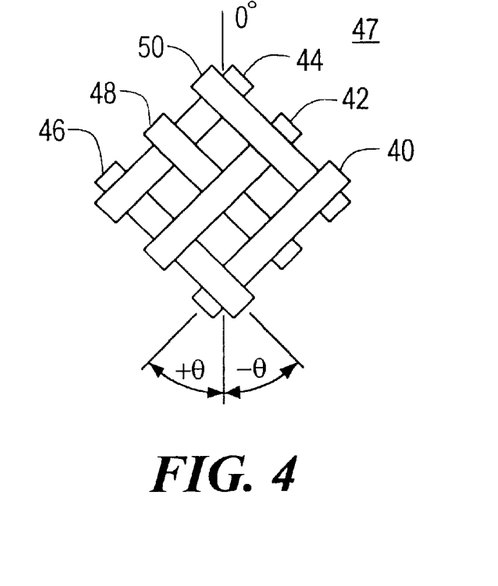
FIG. 4 is a front view of a braid including biased fibers according to this invention.

A single ply with biased braid fiber orientations 47 is also shown in FIG. 4 where tows 40, 42, and 44 are orientated at plus 45° and tows 46, 48, and 50 are orientated at minus 45°. Other angles are possible and within the scope of this invention. The largest commercially available tubular product braider can lay down up to 216 ends simultaneously in three directions. Biaxially braided structures are interlocked in a pattern similar to woven structures and are tailorable to achieve various strength and stiffness requirements. Biaxial fiber orientation is controlled by adjusting the ratio or mandrel feed rate to the rotational speed of the braider carriers. Unidirectional fibers 52, 54, etc., FIG. 5, can be passed through the center of the machine gearing thus interlocking with the biaxial fibers to form triaxial braid 53.

Figure 3:
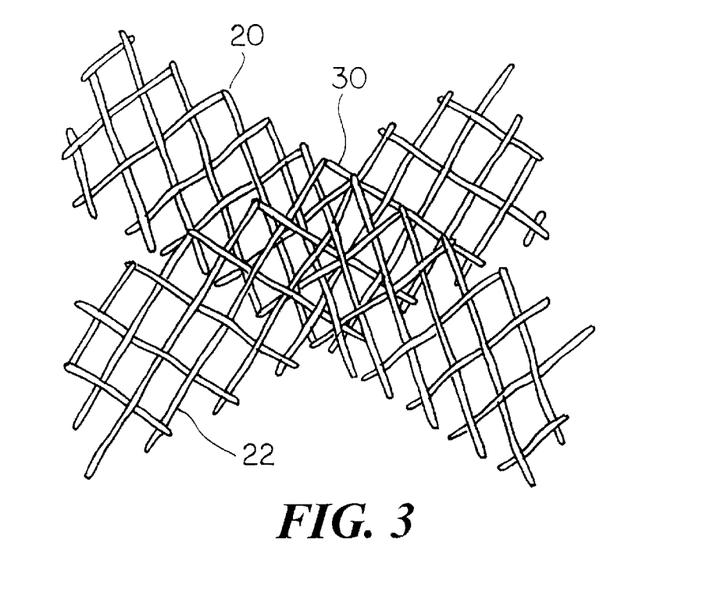
FIG. 3 is a schematic diagram of the biased fibers of one ply of material intersecting the biased fibers of another ply of material according to this invention.
Figure 6:
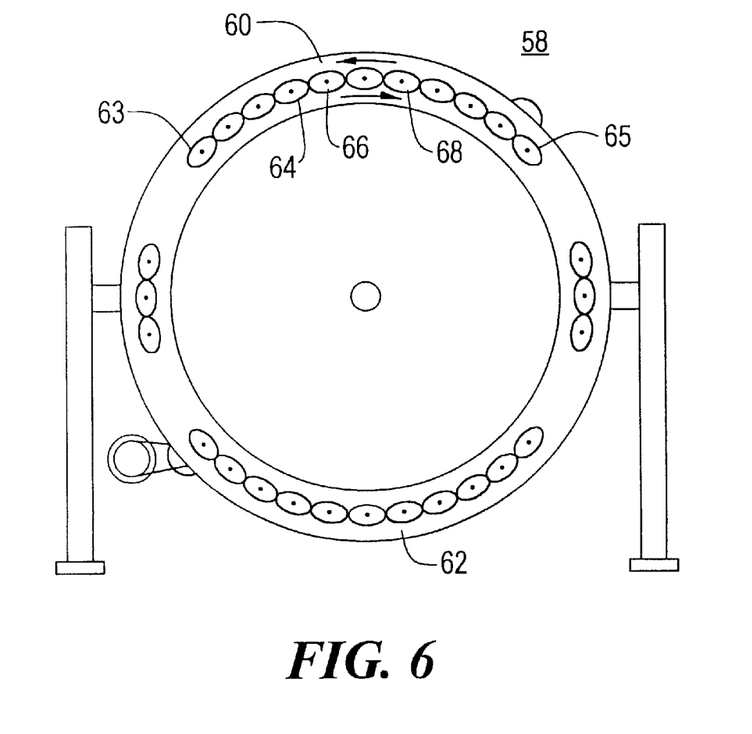
FIG. 6 is a front perspective view of a modified braiding machine for fabricating a continuous braided preform according to this invention.

To accomplish the continuous intersecting plies of biased fibers as shown in FIG. 3, a braider available from Wardell was modified into the dual flat braiding machine 58 shown in FIG. 6. The round braider was divided into top 60 and bottom 62 flat braiders of 32 carriers each, 64, 66, 68, etc. Each braider 60, 62 is capable of forming a 1" wide flat fabric. Carbon fibers, such as 6K T-300, or ceramic, glass, kevlar, thermoplastic or even prepare tows could be used.

Figure 7:
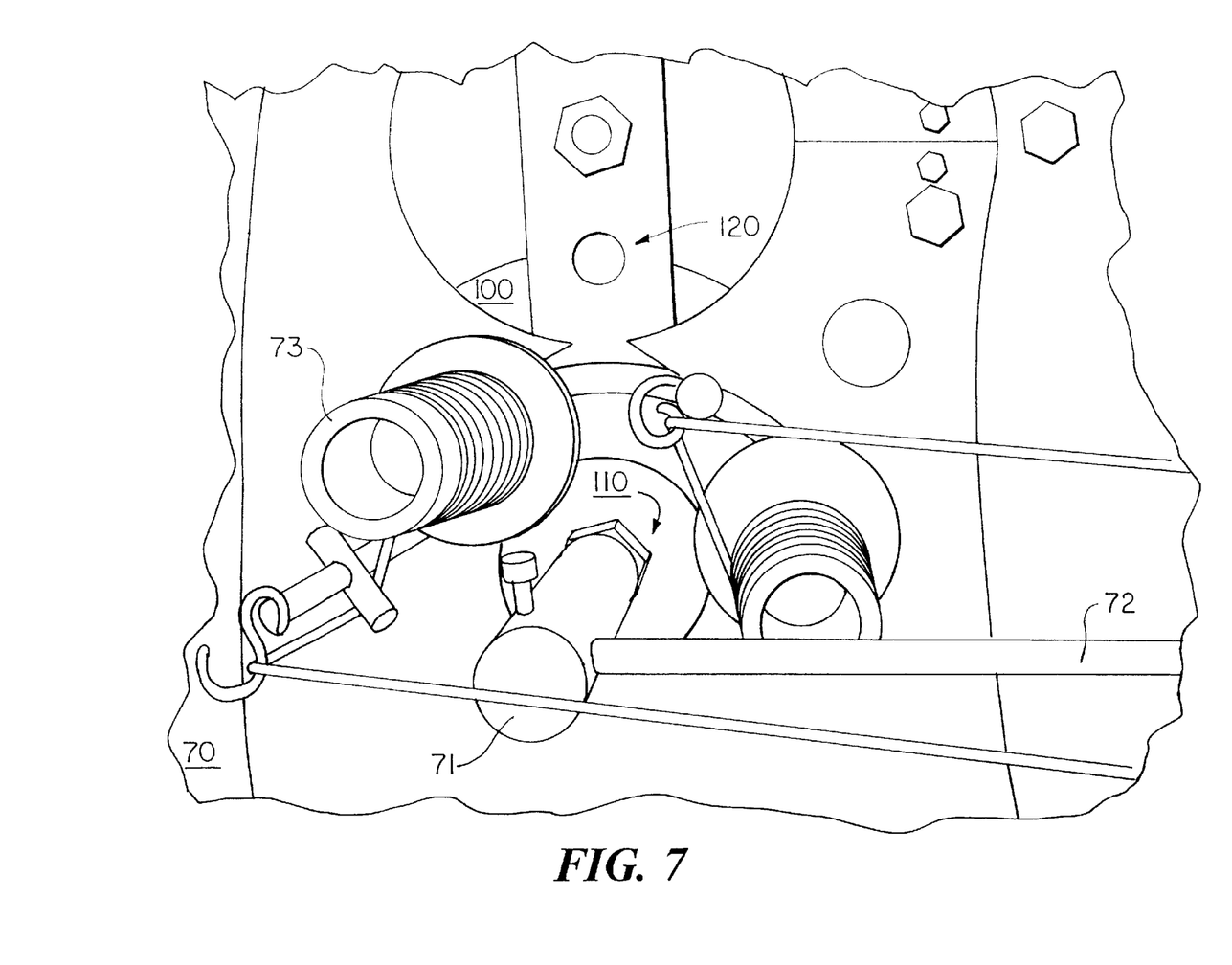
FIG. 7 is a schematic view of a carrier reversing section for flat fabric construction for the modified braiding machine shown in FIG. 6.

The standard braider sections of the Wardell machine were removed from the opposite sides of the braider and replaced with reversing sections 63 and 65, an example of which is shown in FIG. 7. Carrier reversing section 70 for flat fabric construction allows the braider carriers to reverse direction, thus producing a flat fabric. Reversing section 70 consist of three components which vary from standard tubular braider segments: five slotted horn gear 100, FIG. 10; reversing "tear drop" shaped quoit 110, FIG. 11; and fish plate 120, FIG. 12.

Figure 8:
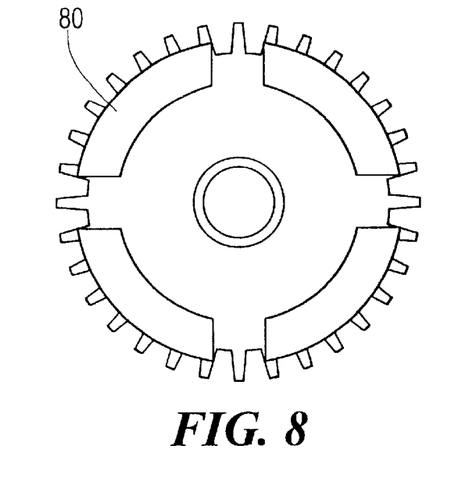
FIG. 8 is a front view of a standard horn gear.
Figure 10:
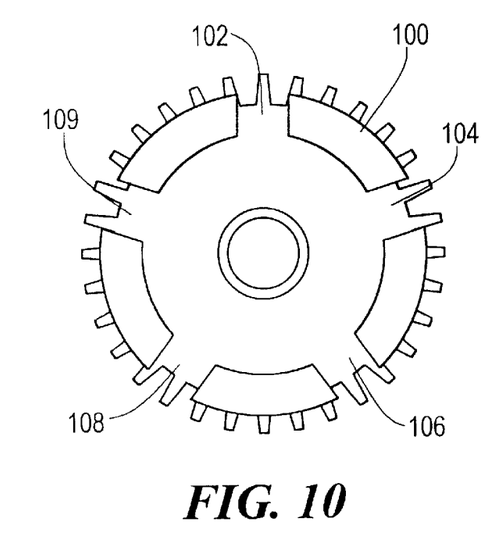
FIG. 10 is a front view of a five slotted horn gear according to this invention for the modified braiding machine shown in FIG. 6.

Five slotted horn gear 100, FIG. 10 has a larger diameter and has five horn dog slots 102, 104, 106, 108, and 109 versus four slots in standard horn gear 80, FIG. 8. The five slots properly time the carrier insertion back into the standard four carrier horn gears at the reversing segment intersection. The larger diameter of the five slotted horn gears require the removal of two standard braider segments.

Figure 9:
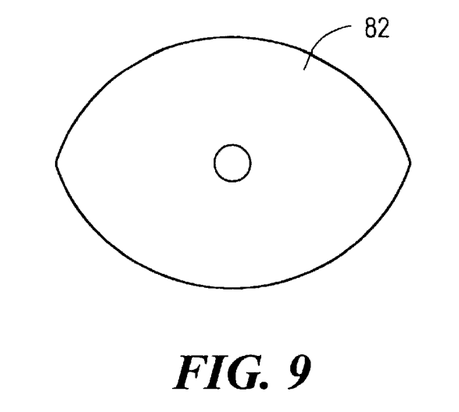
FIG. 9 is a front view of a standard quoit.
Figure 11:
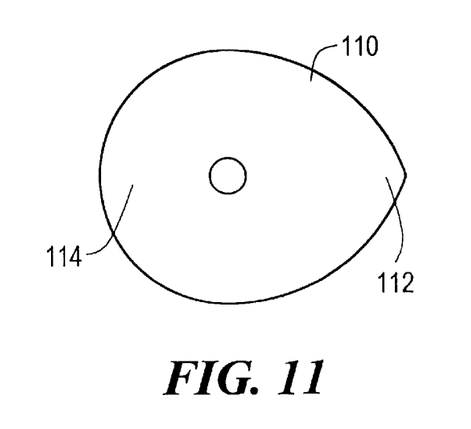
FIG. 11 is a front view of a tear drop quoit according to this invention for the modified braiding machine shown in FIG. 6.
Figure 12:
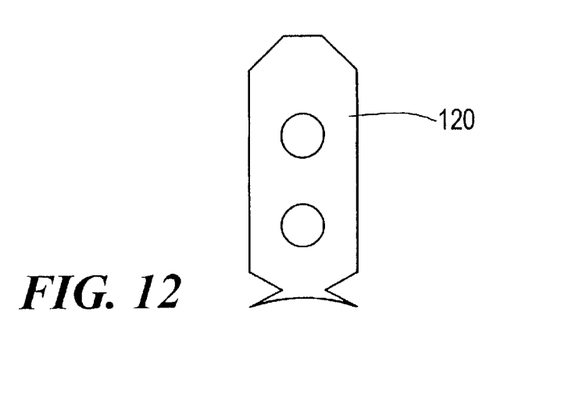
FIG. 12 is a front view of a fish plate according to this invention for the modified braiding shown in FIG. 6.

In contrast to standard quoit 82, FIG. 9, reversing quoit 110, FIG. 11 is eye-shaped on one side only as shown at 112 and round on the other side as shown at 114 to allow carrier reversal. Fish plate 120, FIG. 12, is mounted to the idle warp stud not occupied by the five-slotted horn gear and completes the reversal track section.

The round braider has now been configured into two separate flat braiders of 33 carriers each. Custom selvage posts e.g. post 72, FIG. 7 on selvage warp post 71 were installed on the flat braider to support the edges of the braided fabric as it travels to the braiding point. Carrier 73 includes the fabric which eventually forms, for example, part of braid 130, FIG. 13A.

Figure 13A:
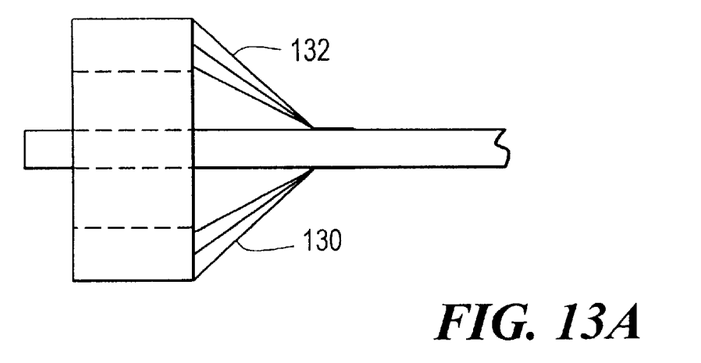
Figure 13B:
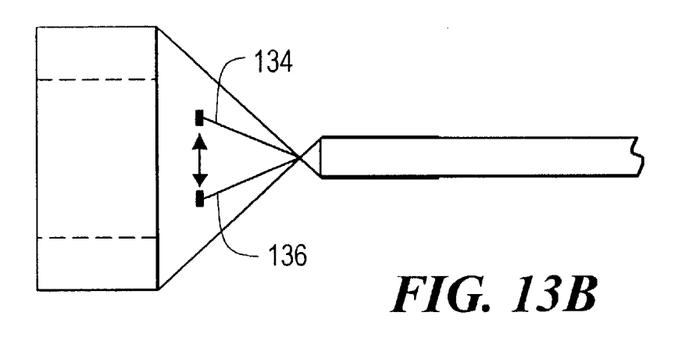
Figure 13C:
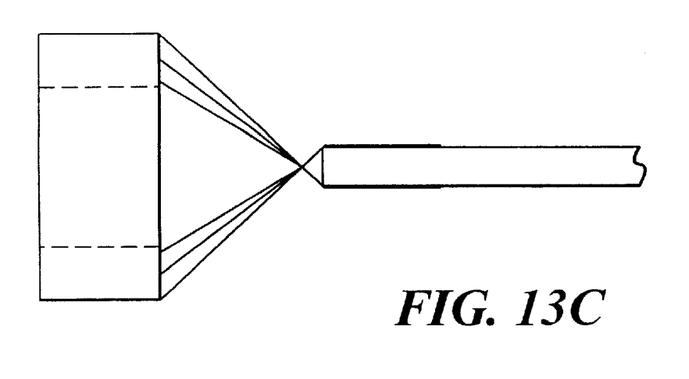

To produce the intersecting element 30, FIG. 3, circular braider 58, split into two flat braiders as shown in FIG. 6, is activated and two flat braids 130 and 132 are simultaneously produced, FIG. 13A. Once these braids are of sufficient length, the fiber packages 134 and 136 of each braider is transferred to the carrier of the other, FIG. 13B. This simulates passing carriers through the openings in a braided structure, the operation required to produce a braided cruciform. It is extremely important to exchange the proper fiber carriers to create an undisturbed structure. Once the exchange is complete, the machine is again activated and the rest of the structure formed, FIG. 13C. At point 138, the intersection shown in FIG. 3 is thus formed.

Figure 14:
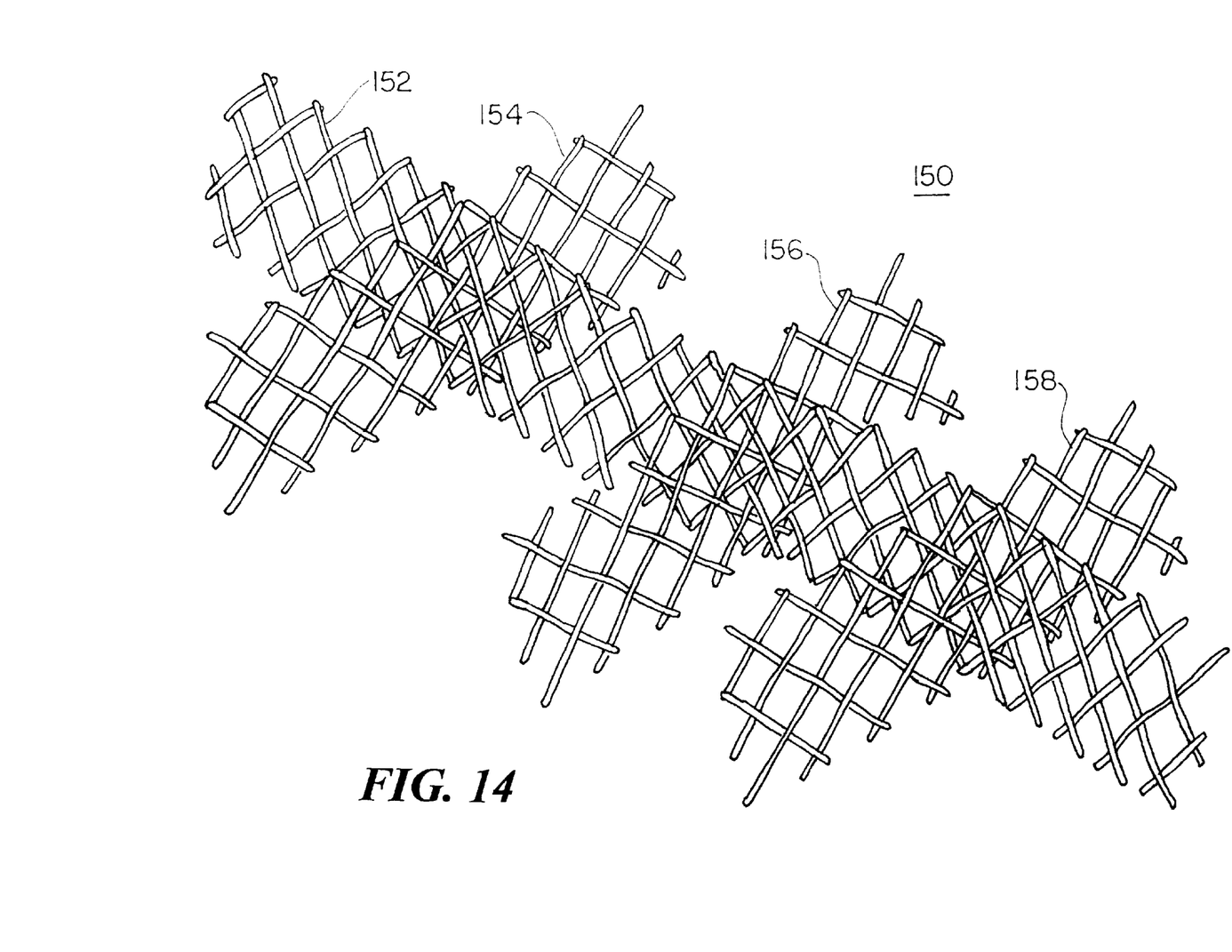
FIG. 14 is a schematic diagram of a preform in which one structural member has a number of plies according to this invention.

This invention is not limited to a single ply of biased fibers intersecting with another single ply. Preform 150, FIG. 14, includes a single ply of biased fibers 152 intersecting with multiple plies 154, 156, and 158 of biased fibers. There could also be additional plies running parallel to ply 152. Plies 154, 156, and 158, form a single stringer, for example, and ply 152 forms a frame member.

Figure 5:
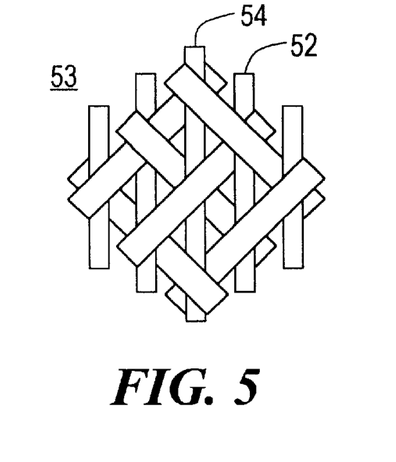
FIG. 5 is a front view of a triaxial braid including biased fibers and fibers orientated at 0°.
Figure 15:
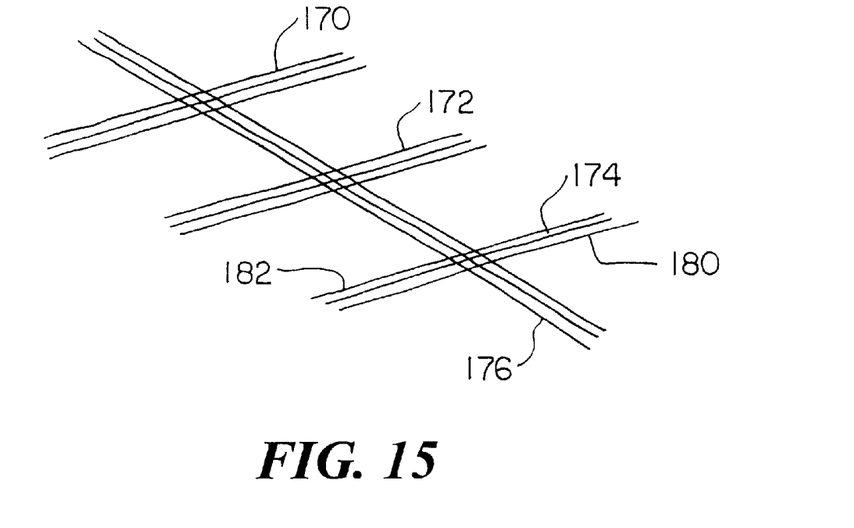
FIG. 15 is a schematic view of a continuous intersecting structure including multiple stringers having biased fibers according to this invention.

In the multiple stringer configuration as shown in FIG. 15, each stringer 170, 172, and 174 intersecting with frame 176 includes three plies of biased braided fabric made up of carbon fibers while frame 176 also includes three plies. Also, each ply 180, 182, etc. could include unidirectional fibers as shown in FIG. 5 resulting in a ply which includes a triaxial braid construction 190, FIG. 16. Tows 191 and 193 are biased while tows 195 and 197 are not biased in the preferred embodiment of this invention. Intersection 192 between two such plies 190 and 194 is also continuous resulting in a stronger part once the preform is resin impregnated in a mold forming a final stringer/frame part.

Figure 16:
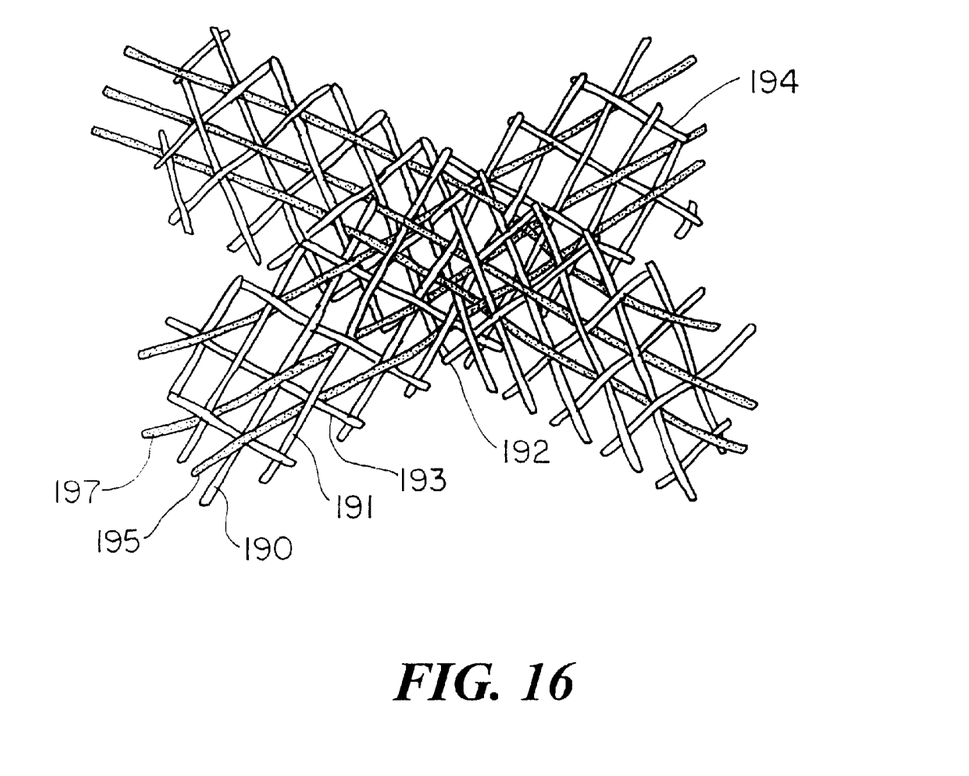
FIG. 16 is a schematic view of a continuous intersecting preform including plies of triaxially biased fibers according to this invention.
Figure 17:
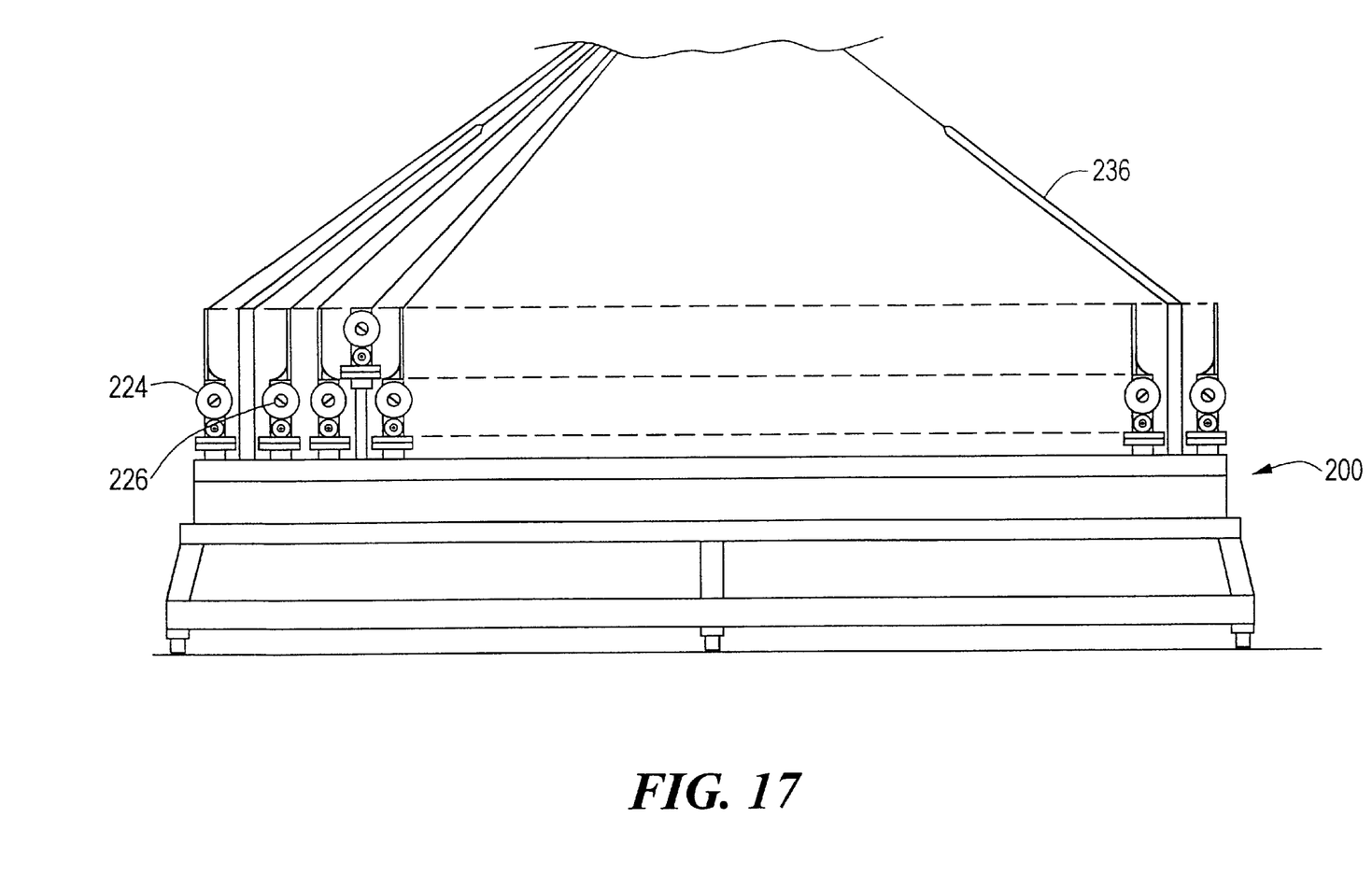
FIG. 17 is a top view of a flat braiding machine in accordance with the subject invention.
Figure 18:
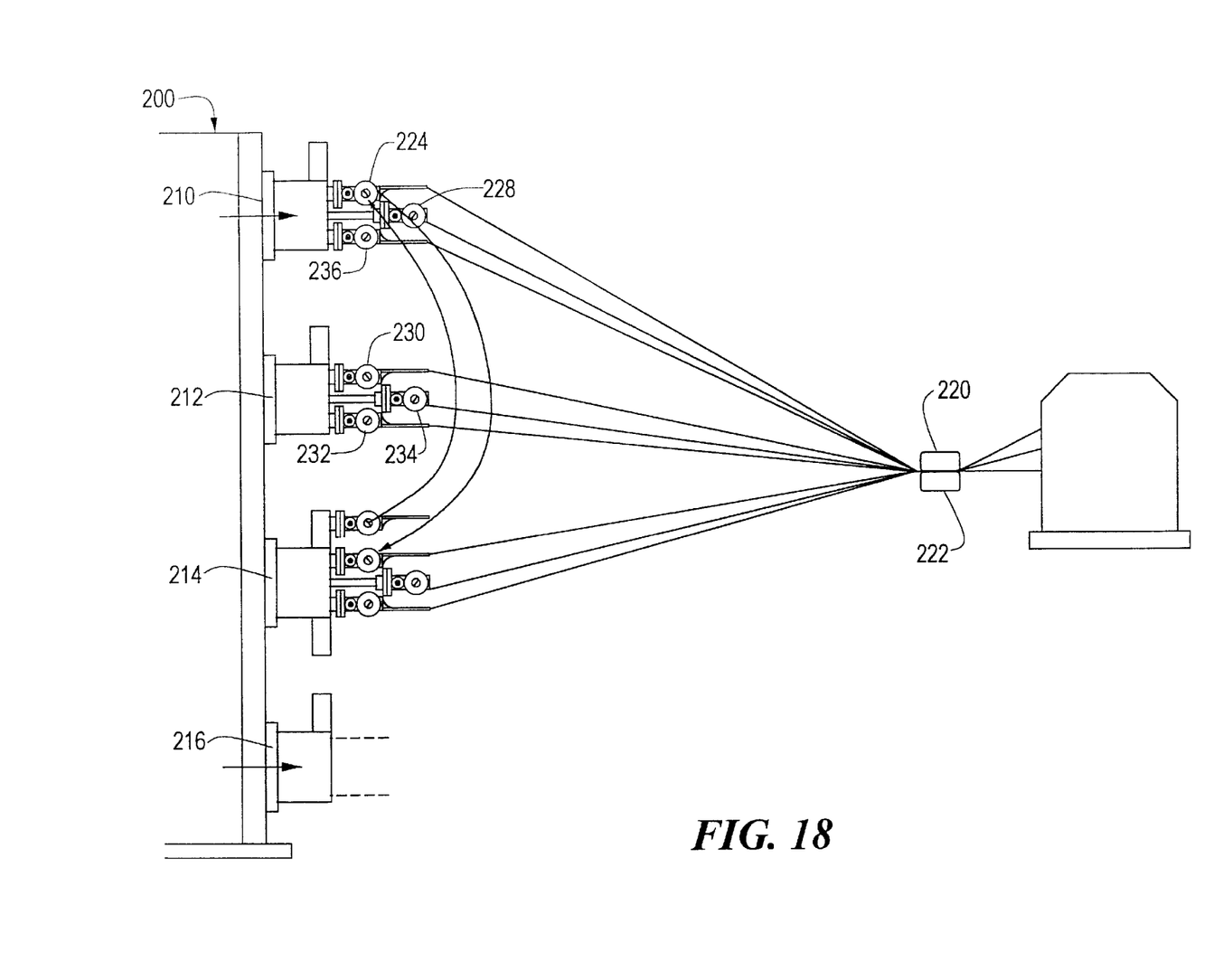
FIG. 18 is a side view of the flat braiding machine shown in FIG. 17.
Figure 19:
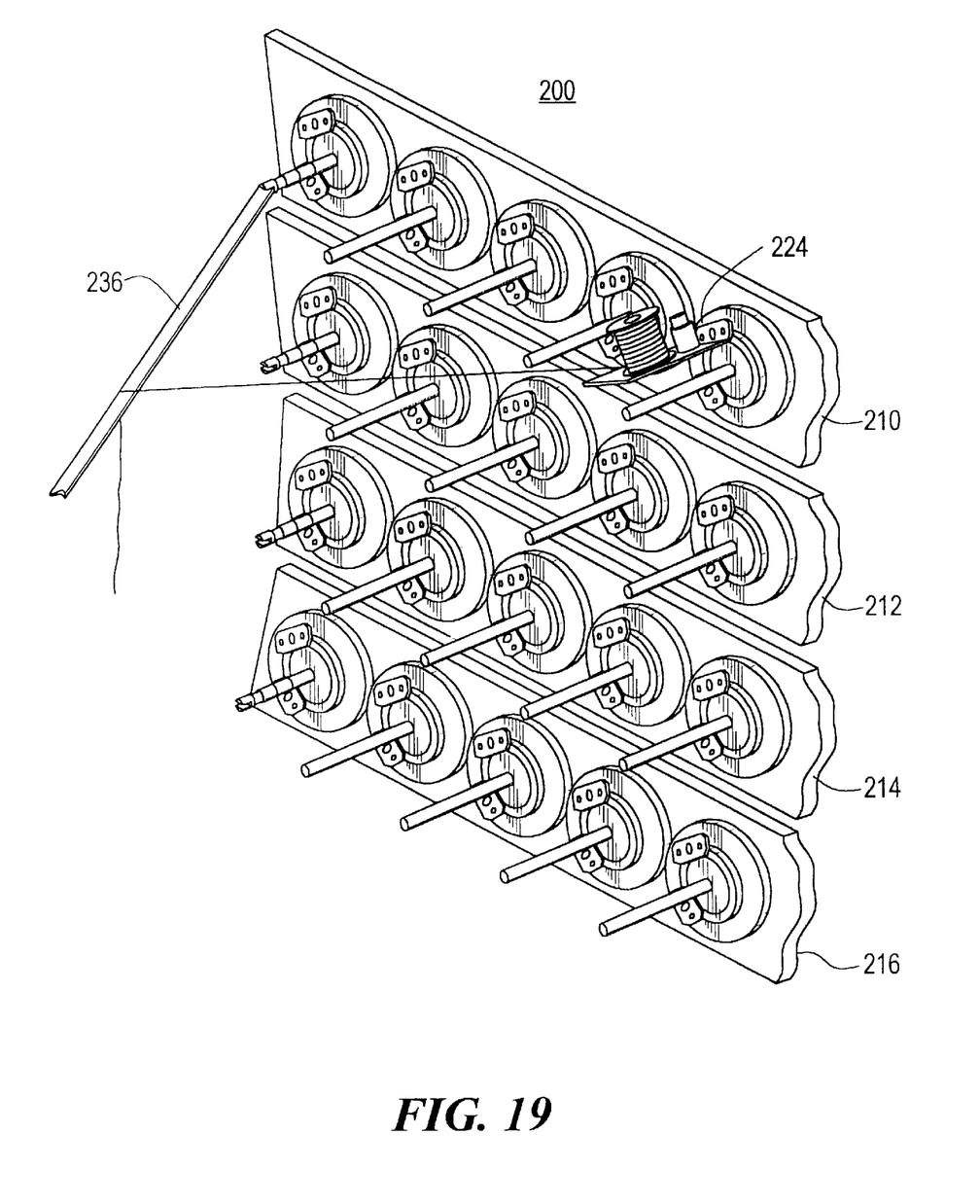
FIG. 19 is a perspective view of the flat braiding machine shown in FIG. 17.

In another embodiment, flat braider 200, FIGS. 17–19 is used to make intersecting plies 190 and 192 FIG. 16. Four braiders 210, 212, 214, and 216 are used to form multilayered braider plies by combining all four flat braiders 210, 221, 214 and 216 in parallel. A multilayered braided type is formed by running all four braiders simultaneously and translating the tape through pull rollers at a prescribed rate to achieve the desired fiber angle.

A braided intersection is formed by exchanging carriers from one braider bed to another. To completely intersect a two ply braid, two exchanges must be completed. The objective is to exchange the carriers of bed 210 with the carriers of bed 212, and the carriers of bed 212 with those of bed 216. A carrier exchange utilizes two people to physically pass carriers from one braider to the next. Carriers equipped with quick release mechanisms enable a rapid manual carrier interchange as discussed infra.

The following step-by-step procedure describes the carrier exchange process. First, the braided material of banks 210, 212, 214, and 216 are clamped at the formation point 220. Next, the braiders are reversed until no tows are crossed between bed 200 and clamp 222. The selvage rods, e.g. selvage rod 236, FIG. 17, are then removed. Carriers 224, 226, and 228 from braider 210 and carriers 230, 232, and 234 are transferred to their proper holding positions on beds 214 and 216 respectively. Carriers from braiders 214 and 216 are then transferred in a like fashion to braiders 210 and 212 respectively. The selvage rods are then reattached. The braider is then operated to re-form the braid between bed 200 and clamp 222. Clamp 222 is then removed from the braided material. The intersection is now complete and braiding is resumed.

Clamp 222 is used to configure all of the plies as close as possible to one another and to allow the open part of the braid to be unbraided without disrupting the fully braided part. This ensures that the quality of the braid under the clamps is not compromised.

The unbraiding step is critical for the fabrication of an intersection. All of the tows must be aligned to allow a direct path for the tows of the other plies brought to the formation point. This will allow all of the fibers to nest properly at the formation point to form the intersection. The selvage rods are removed to allow access to the open braid.

EXAMPLE 1

The applicant developed and optimized a composite design for the F-22 carry-through bulkhead using the intersecting structures technology discussed above.

The F-22 FS 610 bulkhead was selected as the baseline component from which to derive a composite replacement design. This particular component is a highly loaded carry-through member, and it reacts the main landing gear loads. As such, it was a significant challenge compared to more lightly loaded frames, which are not directly loaded from wing bending.

The baseline bulkhead design, made from titanium, was taken from LMTAS F-22 engineering data to serve as a starting point for the composite design. The design problem was simplified by eliminating the landing gear attachments and loads. The simplified metallic design maintains the same basic stiffening configuration as the fill version. Critical loading cases were also obtained for use in the structural analysis tasks. These omitted landing gear loads. The internal arrangement of stiffeners and others features was optimized to take advantage of composite materials. Several combinations of stiffener size versus open bay area were analyzed, and the best solution was chosen based on stress analysis, weight savings, and manufacturability.

The composite design layouts were analyzed against five critical load cases to ensure structural integrity. The web bay sizes were traded against the stiffener dimensions to arrive at the simplest and lowest weight design consistent with achievable stiffener dimensions and stiffness. Manufacturing requirements/limitations of the composite fabrication process were also considered during the design.

A half-scale stiffness component was selected as a technology demonstrator. The main 8-braid ply stiffener was used as the baseline for scaling. A half-scale this stiffener is 4 plies (0.16 in. thick) and maintains the 1.5 in. height. An equivalent axial stiffness stiffener 1 in. high, made of 2 braided plies was designed. The 2 plies contained 0.08 in. of uni AS4 fiber stiffener. The component has two intersected stiffeners attached to a skin. One end of the main spar is tapered in both height and thickness. The stiffeners are offset at oblique angles to demonstrate the capability of conforming to various geometries. The web is 1 in. high and the flanges are 1 in. wide. See FIG. 22.

The flat braider shown in FIGS. 17–19 is currently limited to 27 bias carriers when using four braider banks. A 2 in. wide tape was necessary to form the 1 in. high web and 1 in. flange. Larger fiber tows are needed to develop this width on a relatively small braider. The selected configuration was a 24K AS4 bias and 48K IM7 axial braid architecture. The addition of unifibers between plies enabled a true ½ scale stiffness match to the primary 8-braid ply spar. The thickness taper, was accomplished by dropping off these added unidirectional plies.

Figure 20:
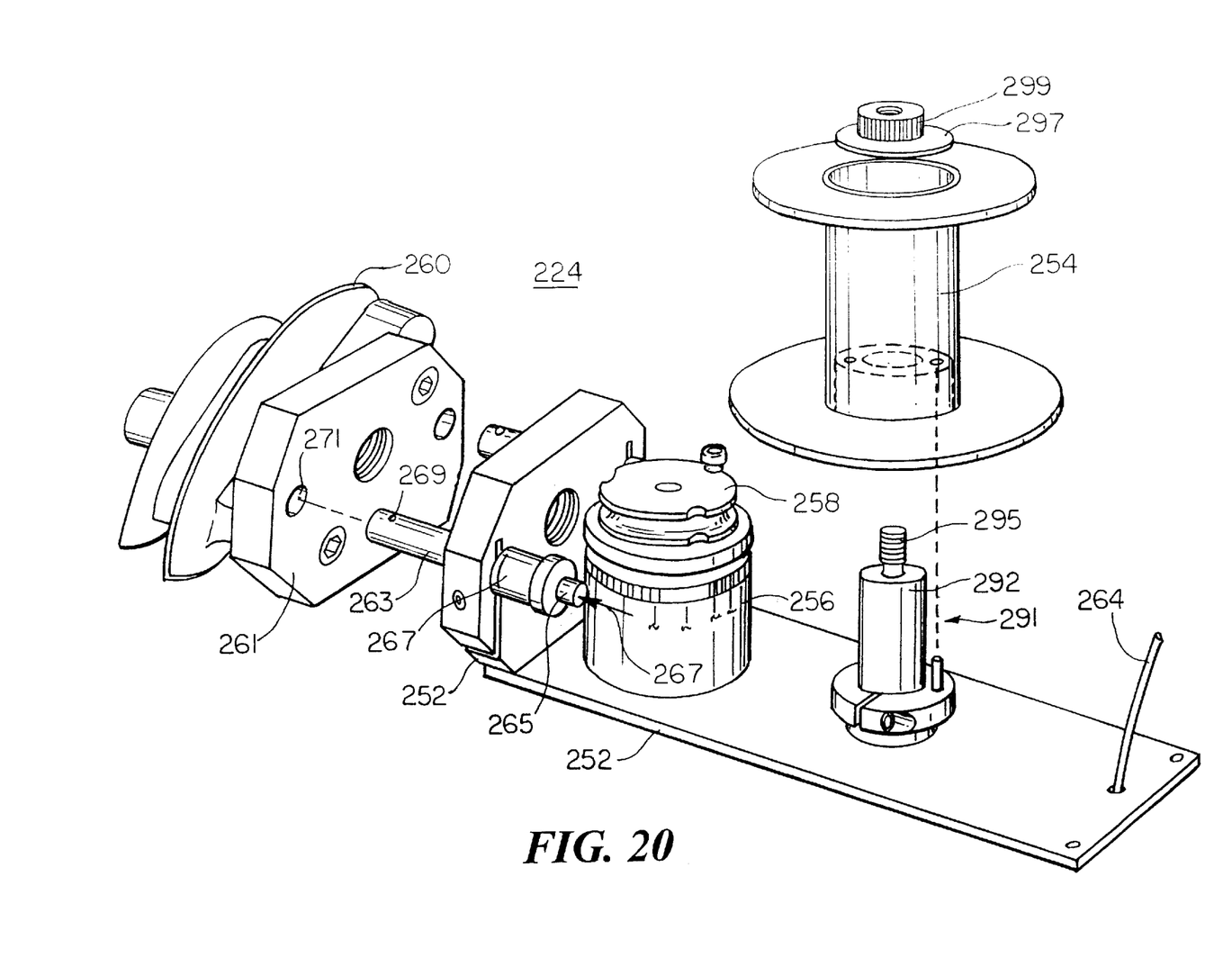
FIG. 20 is a perspective view of a braiding machine carrier in accordance with the subject invention.

Braiding machine carrier 224, FIG. 20, discussed in detail in copending application Ser. No. 08/900,943 filed Jul. 28, 1997 and incorporated herein by this reference, features frame 252 which houses a fiber spool mount subassembly 291 for holding spool 54, fiber take up assembly 256, and magnetic clutch 258. Carrier base 260 is affixed to one end of frame 252 as shown via plate 261 and quick release mechanism coupling assembly 263. Carrier 224 of this invention eliminates the tortuous path of fiber off the spool of prior carriers and instead, fiber, which may be a carbon or ceramic fiber or even prepeg tow material, is fed directly off spool 54 through fiber guide eyelet 264.

Fiber take up assembly 256 includes an internal spiral spring which slowly winds as spool 254 pays out fiber during braiding. Upon reaching a preset release tension, the spiral spring stops winding and magnetic clutch 258 slips to let more fiber off the spool thereby preventing overwinding of the spiral spring. When flat braider 200, FIG. 17, causes carrier 224 to reverse its direction and traverse back to the center of the braider, the spiral spring unwinds and takes up any slack fiber until the fiber begins to pay out again. Instead of the 3 inch take-up of prior art carriers, carrier 224 has a 60 inch take-up capacity. Significantly more take-up (100–200 inches) is also possible if larger spiral springs are used.

Figure 21:
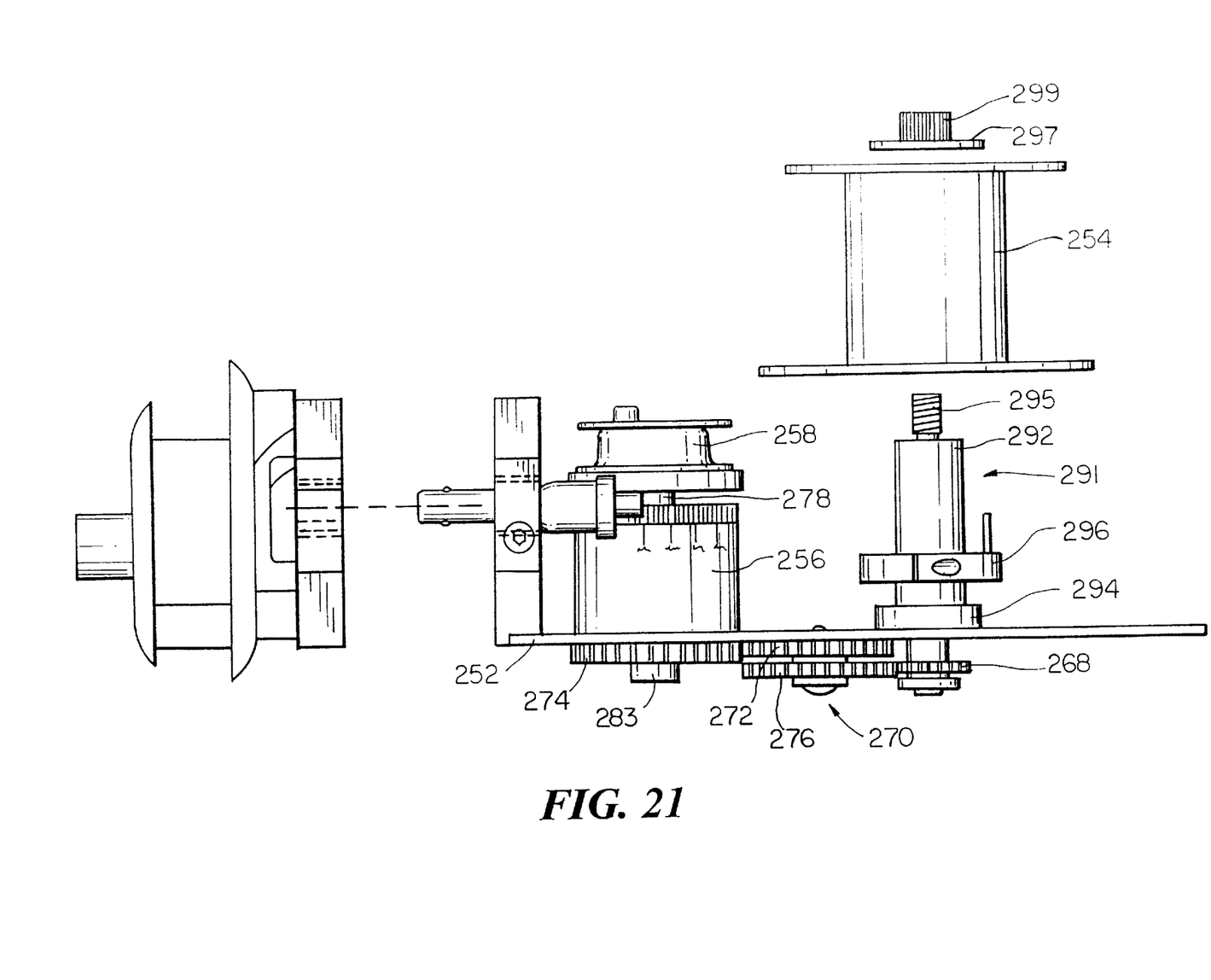
FIG. 21 is top view of the carrier shown FIG. 20.

As spool 254 rotates, gear 268 also rotates. Intermediate gear train assembly 270 includes first gear 272 having teeth meshed with take-up gear 274 and second gear 276 having teeth meshed with fiber spool carrier gear 268. Take-up gear 274 winds fiber take-up assembly 256 to a preset tension and thereafter magnetic clutch 258 slips letting more fiber off the spool. If there is slack in the fiber fed off spool 254, fiber take-up assembly 256 reverses direction causing gears 268, 272, 274 and 276 to reverse direction thereby winding any slack fiber back onto the spool. Shaft 278 of clutch 258 is coupled to take up spring assembly 256 which includes shaft 283 rotatable with respect to frame 252 and connected to gear 274.

Spool 254 is mounted on spool mount subassembly 291 which includes shaft 292 rotatably mounted with respect to frame 252. Gear 268 is affixed to one end of shaft 292. Spacer 294 is affixed to shaft 292 below bottom spool seat member 296. Top spool seat member 298 includes knurled hand nut 299 and washer 297 combination. To load spool 254, nut 299 is removed from the threaded end 295 of shaft 292. Spool 254 is placed over shaft 292 until the bottom end thereof rests on seat 296. Nut 299 is then tightened until the washer portion 297 firmly locks the spool in place.

Clutch 258 includes shaft 278 coupled to fiber take-up assembly 256 which has shaft 283 extending through frame 252 and terminating in gear 274. Intermediate gear train 270 includes first gear 272 meshed with take up spring gear 274 and second gear 276 meshed with fiber spool carrier gear 268. Clutch 258 may be a "Perma-Tork" clutch available from Magnetic Power Systems Inc. and fiber take-up assembly 256 may be an Ametek, Hunter Spring Division, model "ML-1565". After 30–40 revolutions of spool 254, clutch 258 begins turning to prevent overwinding of the spiral spring within fiber take-up assembly 256.

Carrier 224 is particularly useful for braiding higher modulus carbon and ceramic fibers because it eliminates the tortuous fiber path associated with prior art carriers which leads to excessive fiber damage during the braiding operation. In addition, the very limited 3 inch take-up with the prior art design is greatly improved and a 60 inch take-up is possible with carrier 224. Clutch 258 can also be set at different tension levels depending on the type of fibers on spool 255.

Quick release mechanism 263, FIG. 20, allows carrier frame 250 to be quickly disconnected from the braider and moved to another location or stored until its use is required. Quick release mechanism 263 includes biased shaft 265 within housing 267. When shaft 265 is pushed in the direction of arrow 267, bearing 269 is released and then mechanism 263 can be withdrawn from hole 271 in plate 261. As shown, there are usually two such quick release mechanism per carrier.

Figure 22:
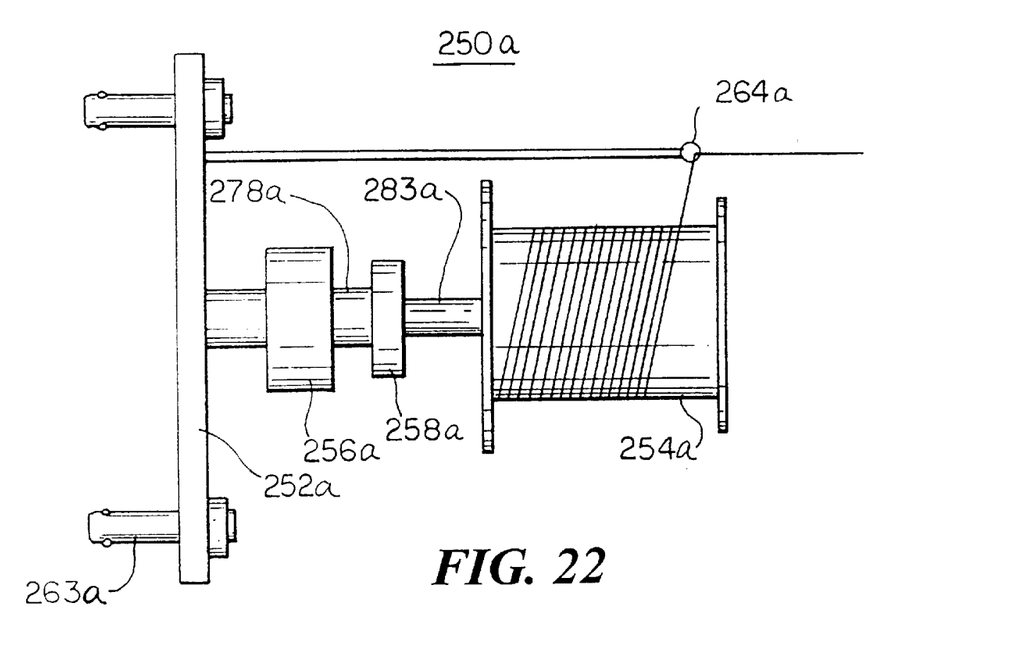
FIG. 22 is a side view of another braiding machine carrier in accordance with the subject invention.

In an alternate embodiment, vertical carrier 250a, FIG. 22 includes frame 252a and fiber take-up assembly 256a coupled directly to clutch 258a via shaft 278a. Spool 254a is coupled to clutch 258a via shaft 283a and fiber is fed off spool 254a through eyelet 264a under tension supplied by fiber take-up assembly 256a. Clutch 258a then allows additional fiber to fed out once take-up assembly reaches its maximum return limit. Carrier 250a is advantageous since there is no need for gear 268, 272, 276, and 274, FIG. 21: everything is coupled directly via shafts 278a and 283a.

Figure 23:
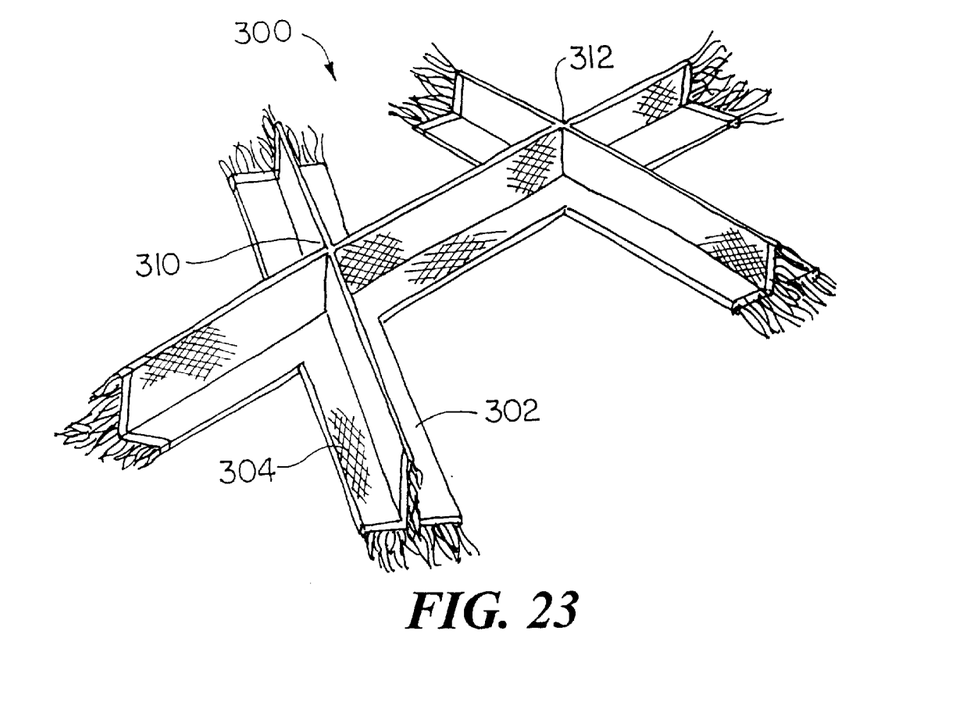
FIG. 23 is a perspective view of a fiber preform made in accordance with the subject invention.

FIG. 23 is a depiction of the fiber preform fabricated in accordance with this invention. Perform 300 has the fiber architecture described above. There were five steps followed for the fabrication of the perform. Intersections 310 and 312 were fabricated sequentially. Care was taken to ensure the intersections were spaced to match the design specified for the demonstration article.

The flat braided tape was cut at each intersection halfway through to form the web. This allowed the bottom half of the tape to be folded out to form flanges 302 and 304 of the stiffeners. The thickness taper was created by staggering the removal of the uni-tows over the span of 2 in. A height taper was formed by staggering the removal of axial fibers over the same 2 in. span as the height taper. The web of the preform was stitched together with carbon to provide stability during placement into the cure molding. The technology disclosed and claimed in U.S. Pat. No 5,667,859 may be used to secure the flanges of each stiffener to plate 303, FIG. 24.

The intersections were formed using the procedures discussed above. The added complication of incorporating axial fibers between plies was accommodated as well. Uniplies were made continuous through the intersection in the same basic manner as creating the basic intersection. However, the uni-fibers were mounted to stationary holders between braider banks.

The thickness an height tapers were hand operations at this time. The process of adding and deleting tows from the preform, however, could be automated. The hand operation is relatively quick and can form accurate tapers economically for limited production runs.

Figure 24:
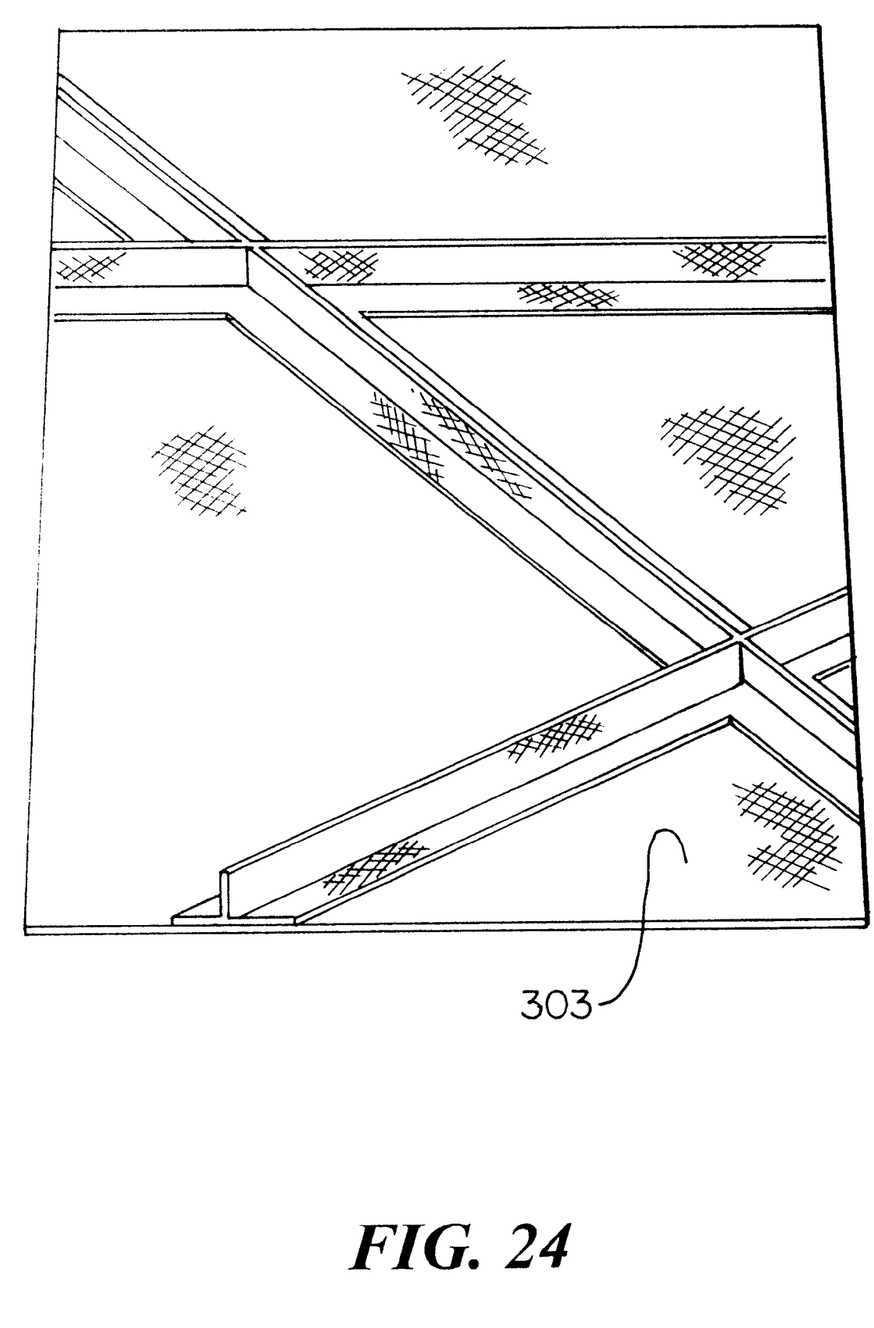
FIG. 24 is a perspective view of the fiber preform of FIG. 23 in its final cured stage.

Braided preform 300, FIG. 23, was then resin infiltrated and cured. FIG. 24 is a diagram of the final cured demonstration component.

There are, however, uses for the continuous intersecting braided composite structure made using the modified circular braider or the flat braider discussed above or by other similar techniques include stiffening elements such as spars, ribs, frames, stringers, and other aircraft components. Another example is a honeycomb structure wherein preform 300, FIG. 23 is sandwiched between two composite face plates.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A continuous intersecting braided composite preform comprising:

a first member including at least one ply having biased fibers;

a second member including at least one ply having biased fibers;

said first member intersecting with said second member, said biased fibers of said first member interstitially arranged with respect to said biased fibers of said second member at said intersection and passing continuously through the biased fibers of the second member.

2. The continuous intersecting braided composite preform of claim 1 in which said ply of at least one said member is triaxially braided.

3. The continuous intersecting braided composite preform of claim 1 in which said fibers of said first member are biased at approximately 45°.

4. The continuous intersecting braided composite preform structure of claim 1 in which said fibers of said first members are carbon.

5. The continuous intersecting composite preform of claim 1 in which said fibers are ceramic.

6. The continuous intersecting braided preform of claim 1 in which said fibers are a prepreg material.

7. The continuous intersecting braided preform of claim 1 in which said fibers are a thermoplastic material.

8. The continuous intersecting braided preform-of claim 1 in which each said member includes three plies.

9. The continuous intersecting braided preform of claim 1 farther including a number of additional intersecting members each including at least one ply having biased fibers intersecting with and passing continuously through the biased fibers of the first member.

10. The continuous intersecting braided preform of claim 1 in which the at least one ply of the first member includes non-biased fibers.

11. The continuous intersecting braided preform of claim 1 in which the at least one ply of both the first member and the second member include non-biased fibers.

* * * * *